United States Patent [19]

Ward et al.

[11] Patent Number: 5,103,421
[45] Date of Patent: Apr. 7, 1992

[54] PROCESS AND APPARATUS FOR DESIGNING A SYSTEM MADE OF COMPONENTS

[75] Inventors: Allen C. Ward, Cambridge; Warren P. Seering, Sherborn, both of Mass.

[73] Assignee: Massachusetts Institute of Technology, Cambridge, Mass.

[21] Appl. No.: 277,251

[22] Filed: Nov. 29, 1988

[51] Int. Cl.⁵ ............................................. G06F 15/20
[52] U.S. Cl. ..................... 395/700; 364/974.1; 364/DIG. 2
[58] Field of Search ... 364/900 MS File, 200 MS File

[56] References Cited

U.S. PATENT DOCUMENTS 4,835,709  5/1989  Tsai .................................. 364/200

OTHER PUBLICATIONS

Serrano, D., "Constraint Management in Conceptual Design", MS Thesis at M.I.T., Jul. 17, 1988.
Ward, A. et al., "An Approach to Computational Aids for Mechanical Design", International Conf. of Eng. Design, Boston Mass., Aug. 1987.
Gross, M.D., "Design as Exploring Constraints", M.S. Thesis at M.I.T., Feb. 24, 1986.
Ulrich, K. T., "Computation and Pre-Parametric Design", M.S. Thesis at M.I.T., Sep. 6, 1988.
Sussman, G. J. et al., "Constraints—A Language for Expressing Almost-Hierarchical Descriptions", Artificial Intelligence, No. 14, 1980, pp. 1-39.
Popplestone, R. J., "The Edinburgh Designer System as a Framework for Robotics: The Design of Behavior", Academic Press Limited, 1987, pp. 25-36.
Mounier, K. L. et al., "Iterative Respecification: A Computational Model for Hierarchical Mechanical System Design", Univ. of Massachusetts, 1988.
Mostow, J. et al., "A Domain-Independent Model of Knowledge-Based Design: Progress Report to the National Science Foundation", working paper #90-1, Rutgers Univ., Mar., 1988.
Davis, E., "Constraint Propagation with Interval Labels", Artificial Intelligence, No. 32, 1987, pp. 281-331.
Shen-Orr, C. D., "Automatic Design of Complex Gear Trains", M. S. Thesis at M.I.T., Jul. 16, 1976.

Primary Examiner—Thomas M. Heckler
Attorney, Agent, or Firm—Bromberg & Sunstein

[57] ABSTRACT

A digitally programmed computer takes as input a schematic of a mechanical system and specification of the overall system including utility and cost functions and provides as output catalog numbers from a pre-defined set for the optimal selection of working components implementing the design. The preferred embodiment provides the user with a high level symbolic language in which to interact with the programmed computer. The process of compilation or transformation from a high level language to a low level description, is based on a formalization of quantitative inferences about hierarchically organized sets of mechanical components and operating conditions. This method allows design compilation without the exhaustive enumeration of alternatives. This method of compilation as demonstrated in the preferred embodiment, is not limited to mechanical systems, but is applicable to any physical system composed of working components able to be defined by connected variables that can be clearly defined within various operating points and where the goal is to design an overall system achieving some pre-defined system requirements.

19 Claims, 3 Drawing Sheets

PROCESS AND APPARATUS FOR DESIGNING A SYSTEM MADE OF COMPONENTS

BACKGROUND OF THE INVENTION

The Government has rights in this invention pursuant to Contract Number N00014-86-K-0685 awarded by the Department of the Navy.

FIELD OF THE INVENTION

The present invention relates generally to the use of data processors to aid in the design of mechanical and other systems. More particularly, the present invention relates to devices of the type used for selecting the optimal components of a physical system given various constraints, such as the type of components desired and various cost and utility functions.

DESCRIPTION OF THE RELATED ART

Devices for the aid of design of mechanical and other physical systems are known in the art.

Many previous design systems simulate or analyze a single completely specified design. One such system uses generate, test and debug schemes to transform differential equations into schematics, and schematics into more pictorial representations. The program does not use quantitative methods for elimination and does not optimize the results, but instead presents the designer with a variety of alternatives.

Another system developed offers the designer a schematic language to work with, however it performs analysis only and does not select components. Another system allows the user to use schematics in building an equation network for analysis of a mechanical design, but again this system performs analysis only and not compilation.

Some programs do select components, but they do not provide the designer with a schematic language enabling the designer to formulate new designs quickly.

A program for architectural design is based on the exploration of alternative sets of constraints and the regions of alternative sets they bound, but again the program provides the user with a variety of alternatives from which to choose.

Some work has been done to provide a system using a schematic language and selected components, but the system propagated inequalities only and was therefore limited its application. One mechanical design compiler was limited to extremely simple mechanical components.

Labeled intervals have been used to describe artifacts, and have been used with constraint propagation to choose certain artifacts.

SUMMARY OF THE INVENTION

A preferred embodiment of the invention consists of a digitally programmed computer that takes as input a schematic of a mechanical system and specification of the overall system including utility and cost functions and provides as output catalog numbers from a pre-defined set for the optimal selection of working components implementing the design. The preferred embodiment provides the user with a high level symbolic language in which to interact with the programmed computer. The process of compilation or transformation from a high level language to a low level description, is based on a formalization of quantitative inferences about hierarchically organized sets of mechanical components and operating conditions. This method allows design compilation without the exhaustive enumeration of alternatives. This method of compilation as demonstrated in the preferred embodiment, is not limited to mechanical systems, but is applicable to any physical system composed of working components able to be defined by connected variables that can be clearly defined within various operating points and where the goal is to design an overall system achieving some predefined system requirements.

BRIEF DESCRIPTION OF THE DRAWINGS

These and other features of the invention will be more readily understood by the following detailed description taken in accompany with the attached drawings, in which.

DESCRIPTION OF SPECIFIC EMBODIMENTS

The invention consists of a digitally programmed computer that takes as input a schematic of a mechanical system and specification of the overall system including utility and cost functions and provides as output catalog numbers from a pre-defined set for the optimal selection of working components implementing the design. The program provides the user with a high level language in which to compose new designs and then performs some of the detailed design process. This high level language allows the user to select icons representing the various mechanical components and to arrange them in a preferred configuration. After the user has input various system constraints, such as cost and utility functions, the digitally programmed computer then selects the optimal components for the design. The process of compilation or transformation from a high level language to a low level language, is based on a formalization of quantitative inferences about hierarchically organized sets of artifacts and operating conditions. This allows the design process without an exhaustive enumeration of the alternatives.

The invention may be implemented in one embodiment in a program written in LISP and run on a Symbolics 3600 Series computer.

The invention relies on a theory of quantitative reasoning about hierarchically organized sets of artifacts under sets of operating conditions. This theory develops important relationships between artifacts, sets of artifacts, operating conditions and design specifications through the use of special labeled interval statements, thereby organizing the artifact sets. Various mathematical operations are performed on these labeled intervals creating a hierarchically of organized artifact sets, a process termed abstraction. Quantitative reasoning about the artifact sets to select the appropriate design components uses two mathematical processes. The first process, termed elimination, eliminates unsatisfactory artifact sets when their labeled interval specifications conflict with the design or operating condition specifications. The second process, termed propagation, propagates design specifications and operating conditions through the use of labeled intervals and equations to every working component in the design. Once the propagated specifications reach a component in the design, the system can then perform the elimination process and discard the artifact sets which will not meet the design specifications. A cycle of elimination, abstraction and propagation is continued until an optimal solution is obtained. The method described deserves further explanation.

Figure 1:
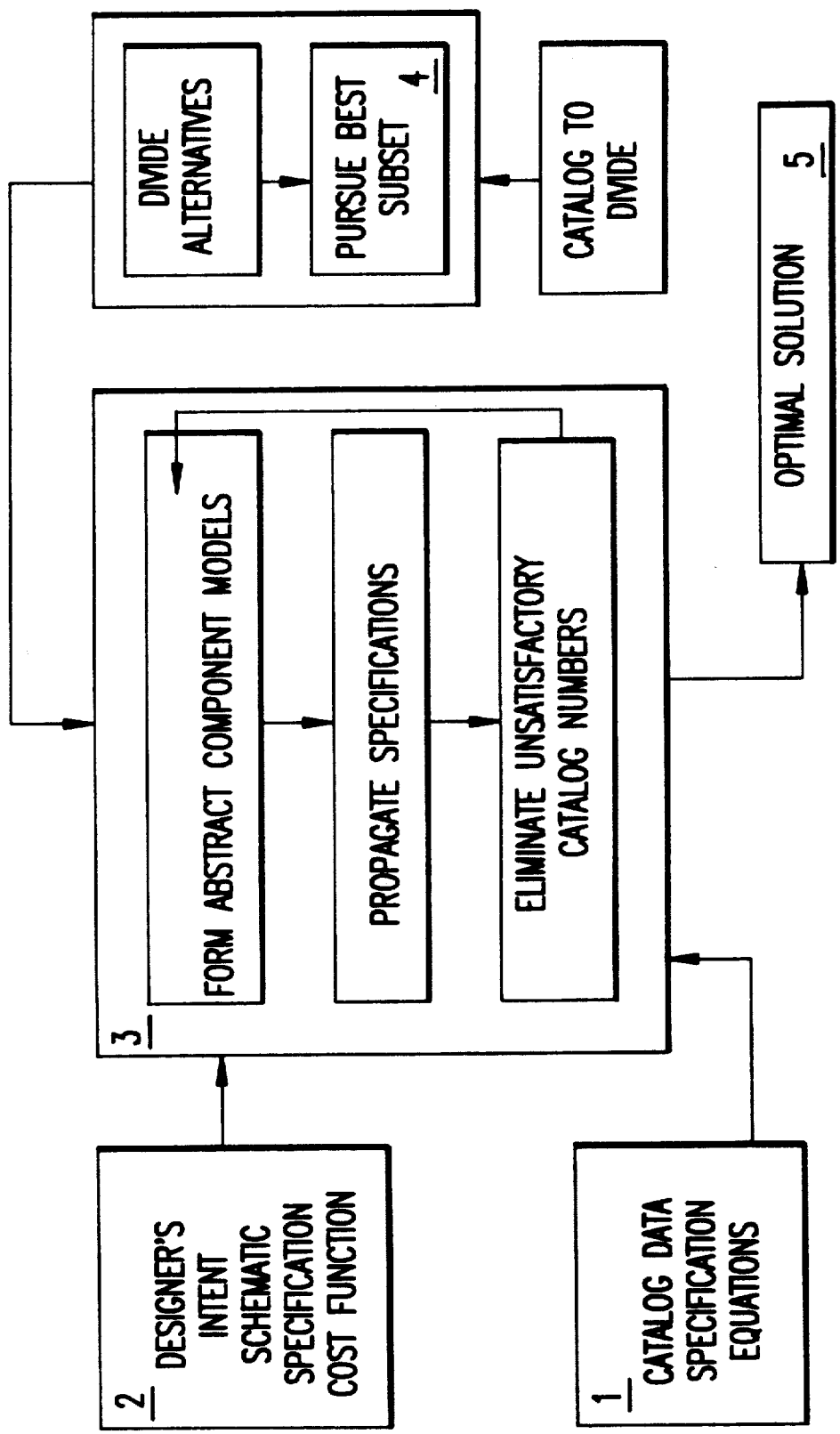
FIG. 1 shows a Block diagram of the compiler.

An overview of the compiler is illustrated in FIG. 1. Block 1 represents the data base of basic artifact sets, such as mechanical components in the preferred embodiment. Each basic set is represented by a single catalog number and if desired, individual components can be represented by serial numbers. The basic artifacts sets within this data base are modeled by an engineer using equations and specifications in a special labeled interval language described in detail below. The engineer then groups the catalog numbers into a hierarchical structure, and the compiler abstracts the information about the basic artifact sets to form descriptions for higher levels in the hierarchy. The compiler abstracts from these artifact sets until a highest level in the hierarchy is created which is then symbolically represented by a icon. For example, the icon may be an electrical motor which represents the union of the basic artifact sets of all electrical motors inputted by the modeling engineer.

The user of the invention composes new designs by pointing at schematic symbols, icons, Block 2, on the computer screen and the system automatically makes the appropriate connections, asking for help to resolve ambiguities. Once a design is defined, the user may assign a new symbol to that design and then compose new designs based on these new symbols, thereby creating ever higher levels in the hierarchy. The compiler automatically eliminates catalog numbers which are incompatible with any basic implementation of the connected components, Block 3. The user provides specifications based on the set of operating conditions, usually loads and input power sources available, and the compiler uses these specifications to form new specifications for other components in the system, a process is called propagation. The propagated specifications cause additional eliminations of possible components. The compiler again performs the abstraction function to produce new specifications based on the user defined system specifications as applied to the new smaller artifact sets, triggering further propagation and elimination. When the cycle of abstraction, elimination and propagation ceased, a variety of possible choices may still remain. The user then provides additional constraints, usually based on cost and/or weight to eliminate other possible choices.

Additionally, the user may split one or more catalogs for one of the components creating daughter designs, Block 4, one for each of the splits and the compiler abstracts new specifications for the smaller artifact sets. These specifications would then trigger another cycle of eliminations and propagation. The process continues until a single catalog number remains for each component in the design, thereby completing the design process and resulting in the optimal selection of working components, Block 5.

Figure 2:
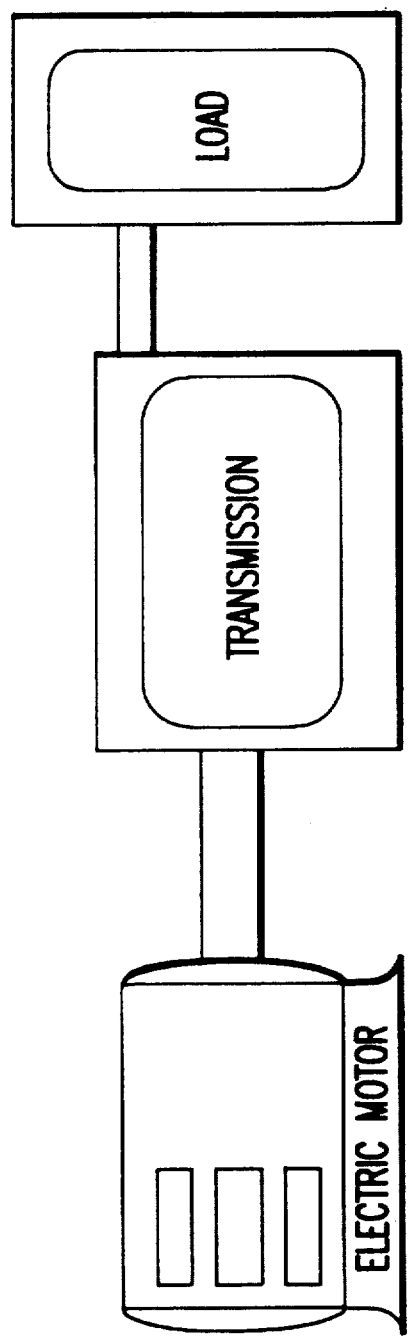
FIG. 2 represents a simple mechanical system used as an example of the method by which the compiler selects the component parts.

For example, FIG. 2 shows a simple schematic of a mechanical system composed of a motor connected to a transmission which is then connected to a load. The user may specify that the available power outlet is 110 Volts. The compiler would automatically eliminate all motors that do not operate on 110 Volt supply from the artifact set of possible alternatives. The user must specify a load requirement, such as a range of possible output torques needed. This information is propagated from the load to the transmission output giving the allowable interval of output torque values from the transmission. This constrained interval results in elimination of the incompatible transmissions, those not having an output torque falling within the constrained interval. The compiler propagates the output torque specification to the input of the transmission, which then becomes a constrained interval acting on the artifact set of motors. The compiler compares the transmission input torque constrained interval to the artifact set of motors eliminating those motors incompatible with the interval. The user may specify cost functions to be optimized thus eliminating other components.

The cycle of propagation and elimination continues until no more eliminations can be made, however, many choices of transmissions and motors may still remain. To narrow the choice down further, the user may split the catalog of a component, resulting in two daughter designs. For example, the motor catalog may be split into a large motor catalog and a small motor catalog. These daughter designs can then be optimized, each in a process as detailed above and after possibly many cycles, each component in the design would be established. Consequently, after many iterations of abstraction, elimination and propagation as well as creating daughter designs, the user is left with the optimal selection of components outputted in the form of catalog numbers.

The theory of quantitative inferences on which the mechanical design compiler is based allows the compiler to eliminate unsatisfactory alternatives from cataloged sets of artifacts. This method of searching artifact space and eliminating whole volumes of artifact space which are incompatible with the constraints imposed on the system is much more efficient than a system where each alternative is enumerated and checked. The theory by which this method is achieved shall be reviewed.

Mechanical components work over a range of values, consequently operations over real number intervals are required. The compiler uses eight such operations on intervals. The first five, as shown below, are common to set theory.

| | |
|---|---|
| *Intersection | $\cap$ |
| *Not-Intersection | $\not\cap$ |
| *Filled-Union | $\cup$ |
| *Subset | $\subset$ |
| *Not-Subset | $\not\subset$ |

The sixth operation is termed the Range function. The Range function takes an implicit equation in three variables and a pair of intervals in two of the variables and returns the compatible interval in the third variable. More precisely, suppose that $g(x,y,z)=0$ is the implicit equation in three variables, x, y, and z. Further, X and Y are intervals in x and y respectively. Then Range $(g,X,Y)—>Z$, where Z is the minimal interval such that for every assignment of x within the interval X and y within the interval Y, there is an assignment of z within the interval Z which satisfies g.

For example, suppose that the only available range of mechanical transmission ratios were 2 to 4. Further, suppose that any value input load torque above 8 will cause damage to the load. The equation, ti=to/ratio, expresses the implicit relationship between the input torque, transmission ratio and output torque. The transmission ratio is constrained to the interval from 2 to 4 and the output torque is constrained to the interval from 0 to 8, consequently the input torque is constrained to values between 0 and 4. Explicitly, Range(ti−(to/ratio)=0, <to 0 8>, <ratio 2 4>)↦<ti 0 4>.

Figure 3:
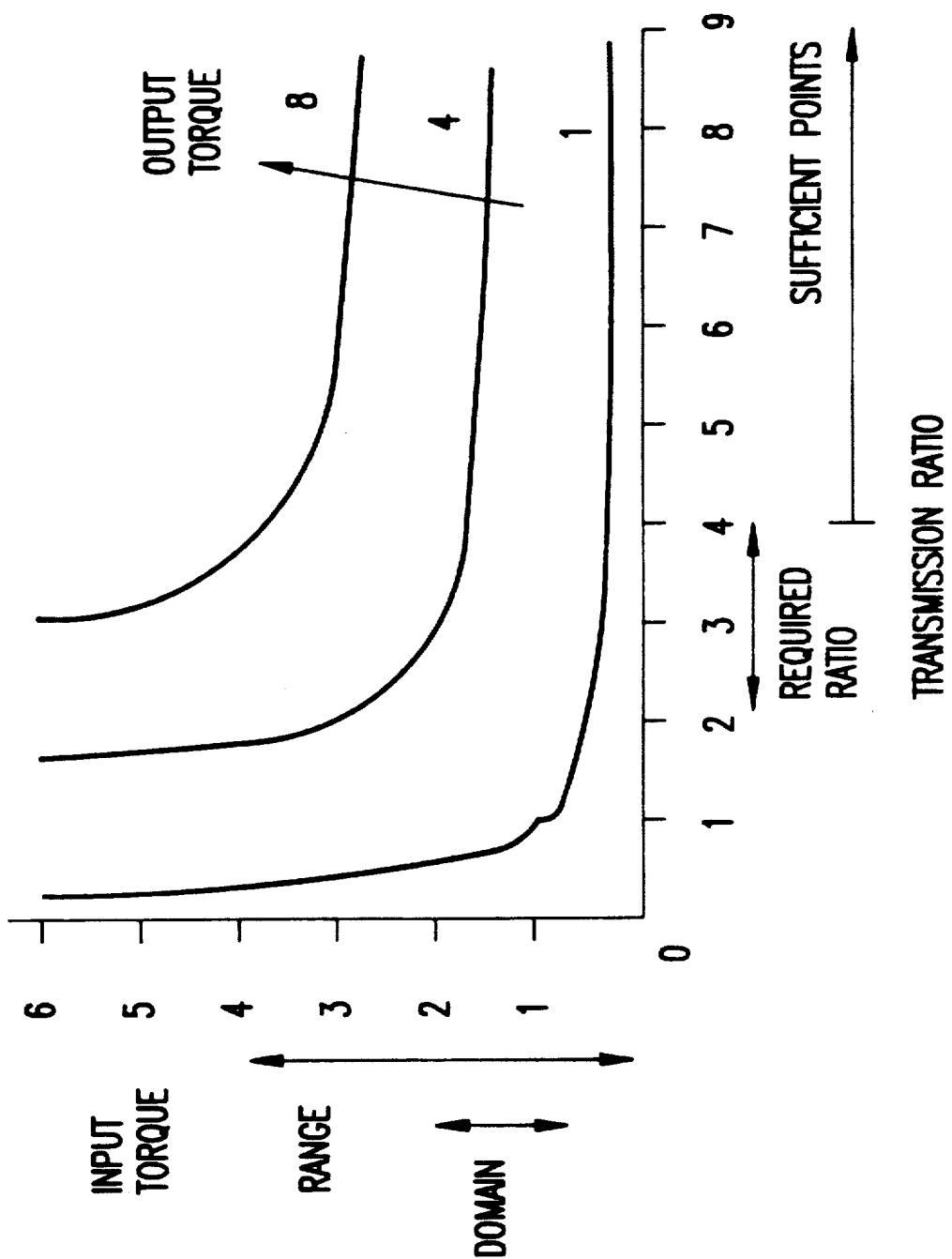
FIG. 3 is a graphical representation of the Range, Domain and Sufficient-Points functions applied to connected operating region variables.

This operation is shown graphically in FIG. 3. The range of input torques is plotted on the vertical axis and transmission ratios on the horizontal axis. Lines of constant output torque are plotted as curves.

The seventh operation is termed the Domain function. The Domain function is a partial inverse of the range function. This function takes an implicit equation in three variables, a defined interval over one variable, and a second variable that must vary throughout the defined interval but is not limited to these values alone, and returns a third variable.

For example, suppose the load requires torques ranging from 0 to 8 to drive it. With the same interval on the transmission ratios as before, we conclude that we need motors able to provide torques ranging from 0 to 2. This is shown graphically in FIG. 3.

Domain(ti−(to/ratio)=0, <to 0 8>, <ratio 2 4>)↦<ti 0 2>.

The Domain is an inverse of the Range because,

Range(ti−(to/ratio)=0, <ti 0 2>, <ratio 2 4>)↦<to 0 8>.

The last operation is termed the Sufficient-Points function. It takes an implicit equation in three variables, an interval over one variable that the variable must at least satisfy one point within that interval but can extend out of the interval, an interval over another variable that is rigidly defined and returns a continuous set over which the third variable can vary. For example, suppose that the input torques are limited to a value of 2 and the load requires torques up to 8. FIG. 3 shows that any transmission ratio of 4 or greater will satisfy this requirement. Formally, SUFPT(ti−(to/ratio)=0, <to 0 8>, <ti 0 2>)↦<ratio 4 ∞>.

The compiler requires formal specifications for the components in the form of special labeled intervals in order to execute the various design decisions such as abstraction, elimination and propagation allowing the compiler to select the components resulting in the optimal design. The special interval labeled language used by the compiler to model the artifact sets is now described.

The Limits interval, symbolized by (only), indicates that values of the variable will or must be drawn from the defined interval and can not go outside the interval. Thus, <(only) T 0 10>, means that the torque must not reverse or go above 10. The Operating-Region label, symbolized by <every>, means that the variable must assume every value in that interval but can assume values outside that interval as well. Therefore an interval such as, <(every) T 0 10>, would mean that the torque must at least assume every value from 0 to 10 but can also assume values greater than 10.

The Limits and Operating-Region labels are used in conjunction with the Required, Assured and No-Stronger labels to further divide the specification statements. The Required label (R), means the interval statement must be true of all the artifacts represented for proper function. For example, suppose it is required that the speed of a motor be regulated to values between 1,750 and 1,800 RPM or else damage to the load is likely, this can be expressed in labeled interval language as, (R (only) RPM 1750 1800).

The Assured label (A), indicates that a particular statement is assured to be true for all the artifacts represented under normal operating conditions. Consequently, the statement, <A (only) RPM 1725 1800>, is a statement assuring that the speed of a certain artifact set is regulated to be between 1725 and 1800 RPM.

The No-Stronger-Possible (N) interval label means that no subset of artifacts within a given set can be guaranteed stronger limits on its operating ranges. For example, this interval label is well suited for a set of high-slip motors capable of regulating the speed only within the interval of say 1725 to 1800 RPM. This statement can be expressed as <N (only) RPM 1725 1800>. The Required, Assured and No-Stronger interval labels are shown in the examples above only in conjunction with the only label, but can be also used in conjunction with the every label as well, thereby expanding the artifact specifications.

In addition to the interval labels defined above, each quantity can be designated as either a parameter which is a fixed value or a state-variable which is allowed to vary during operation. The labeled interval language described above assumes the artifacts are used in normal operating conditions, that is, not under transient conditions.

Three types of formal operations enable the compiler to infer the correct components from the artifact set, these are: elimination; abstraction; and specification propagation. The elimination operation disposes of artifact sets whose labeled interval specifications conflict with the specifications imposed by the user or by other parts of the design. For example, suppose that a motor-load power train are required to have the speed regulation requirement of <R (only) RPM 1750 1800> and therefore motors with weaker speed regulations, such as, <N (only) RPM 1725 1800>, should be eliminated. Formally, <N (only) X xl xu> ⊄ <R (only) X xl xu> →eliminate, with X taken to be RPM and xl and xu the lower and upper bounds of the corresponding intervals. Since the No-Stronger possible specification is not a subset of the Required specification, the program removes the incompatible catalog numbers from the possible component artifact space. There are four different elimination patterns shown below which are used in the preferred embodiment. When the (R A) appears, this means that the either the Required or Assured statements can be used.

<(R A)(every) x ... > ⊄ <(R A)(only) x ... > →eliminate;

<(R A)(only) x ... > ⊄ <(R A)(only) x ... > →eliminate;

<N (only) x ... > ⊈ <(R A)(only) x ...
> —eliminate.

<(R A)(every) x ... > ⊈ <N (every) x ...
> —eliminate

The second formal operation in quantitative inference, termed abstraction, allows the compiler to form higher level hierarchical artifact sets out of individual artifact sets and artifacts sets lower in the hierarchy so as to form global artifact sets. These global artifact sets are then represented as icons on the computer screen offering the user a high level language with which to form schematics of mechanical systems. The user of the system inputs the relevant manufacturer supplied design information about each component using the labeled interval statements described earlier. The user also instructs the compiler which of the different components are of a similar type thereby forming the first level in the hierarchy. The compiler then abstracts from these artifact sets higher levels in the hierarchy until all components of a similar type are represented under a single global artifact space. For example, the user may input design information about 5 different two-phase electric motors each with different speed and torque characteristics and 3 different three-phase electric motors also having varying speeds and torques. The user instructs the compiler to group the three-phase motors together, to group the two-phase motors together, and to group all motors together. The compiler then abstracts the user inputted design information to form a global artifact space representing all the motors available and assigns an icon to this global artifact space, a motor in this case.

The compiler uses either the intersection or the filled-union operation to abstract artifact sets. The operation used depends on the type of labeled interval used to specify the artifact set. For example, the compiler would abstract, <A (only) RPM 1150 1200> and <A (only) RPM 1750 1800> to form <A (only) RPM 1150 1800>. There are six different abstraction operations which are shown below, each appropriate to the different types of labeled intervals involved.

| Interval Type | Operation |
|---|---|
| <A (every)> | ∩ |
| <A (only)> | ∪ |
| <R (every)> | ∩ |
| <R (only)> | ∪ |
| <N (every)> | ∪ |
| <N (only)> | ∩ |

The last and most complicated set of operations allows the propagation of labeled intervals using equations. These operations allow the compiler to pass specifications from one component to another and from system design to component. This operation is similar to the well-known technique of interval constraint propagation but is much more flexible. This is because the design specification descriptions explicitly represent sets of artifacts and operating conditions rather than a single artifact under a single operating condition. This flexibility requires the two new interval operations defined earlier, range and domain, as well as a special labeled interval language in order to represent the artifacts sufficiently.

The compiler uses 22 different propagation operations, all of which are shown below. The first is represented by the following:

<(RA)(only) v1>&<(RA)(only) v2>& g(v1, v2, v3)=0 →<(RubA)(only) v3 Range>.

The labeled interval patterns to the left of the arrow are matched with an equation linking three different intervals, while the pattern to the right of the arrow defines the form of the output. The equation g( v1, v2, v3) =0, matches equations linking the two input variables and the output variable. The symbol (R A) is used to indicate that either the Required or Assured statements can be used. The (RubA) in the output indicates that the output will be Required unless both the inputs are Assured, in which case the output is likewise Assured. The Range operation in the output pattern indicates that the numeric values of the output interval are to be found by applying the Range operation to the input labeled intervals For example, suppose that the only transmission ratio values available are from 2 to 4 and that output torques from the transmission driving the load above 10 will cause damage to the load. These specifications are propagated from the load to the input of the transmission as follows;

<R (only) to 0 10>&<R (only) ratio 2 4>&
((to/ratio)−ti=0) →<(R (only) ti 0 5>.

Meaning that the compiler applies the Range operation to the implicit equation in three variables given two variables with their associated intervals and derives an interval of allowed values for the third variable. Consequently, the input torque is Required to be in the interval from 0 to 5. Notice that the specifications on other variables, transmission ratios and output torques, have been "propagated" to establish the input torque interval. The compiler will then use the elimination operation to dispose of any motors having an output torque above 5.

The list below shows all the propagation operations as used by the design compiler. Symbols representing the associated equations are omitted for brevity. The list (p s) may be matched against either a parameter or a state-variable. The ↑ and ↓ operations, extend the interval upward to infinity or downward to zero respectively. The some label indicates that the variable must take on at least one value in the interval.

<A (every) s1>&<A (every) s2>→<A (every) s3
Range>

<R (every) s1>&<R (every) s2>→<R (every) s3
Range>

<N (every) s1>&<N (every) s2>→<N (every) s3
Range>

<(RA) (only) (p1 s1)>&<(RA) (only) (p2
s2)>→<(RubA) (only) (p3 s3) Range>

<(RA) (every) s1>&<(RA) (only) (p2
s2)>→<(RubA) (every) s3 Domain>

<(RA) (every) s1>&<(RA) (only) s2)>→<R
(only) p3 SufPt>

<N (every) s1>&<N (only) p2>→<N (every) s3
Domain>

```
<N (every) s1>&<(R A) (only) (p2 s2)>→<N
(every) s3 Range>

<A (every) s1>&<N (only) p2>→<N (only) s3
Range>

<R (every) s1>&<N (every) s2>→<R (only) p3
SufPt>

<R (every) s1>&<N (only) s2>→<R (every) s3
Domain>

<N (only) (p1 s1)>&<(R A) (only) (p2 s2)>→<N
(only) (p3 s3) Domain>

<R (only) s1>&<N (only) p2>→<R (only) s3
Domain>

<R (every) s1>&<N (only) p2>→<R (every) s3
Range>

<(R A) (every) s1>&<(R A) (only) (p2
s2)>→<(RubA) (some) s3 SufPt>

<(R A) (every) s1>&<N (every) s2>→<(RubA)
(some) s3 SufPt>

<(R A) (every) s1>&<(R A) (some)
s2)>→<(RubA) (every) s3 (Domain (s1 s2) ∪
Domain ( * (s1) s2)) ∪ (Domain (s1 s2) ∪ Domain
( , (s1) s2))>

<(R A) (every) s1>&<(R A) (some)
s2)>→<(RubA) (some) s3 (SufPt (s1 s2) ∪ SufPt
( * (s1) s2)) ∪ (SufPt (s1 s2) ; SufPt ( ; (s1)
s2))>

<(R A) (only) (some) (p1 s1)>&<(R A) (some)
s2)>→ <(RubA) (some) s3 Range>

<(R A) (only) (some) (p1 s1)>&<(R A) (some)
s2)>→<(RubA) (only) p3 Range>

<(R A) (some) s1>&<N (only) p2)>→<(RubA)
(some) s3 Domain>
```

Although the forgoing is a description of specific embodiments of the invention used primarily in mechanical design, it will be appreciated that the invention may be embodied in a variety of forms diverse from those and described without departing from the spirit and scope of the invention as defined by the following claims.

What is claimed is:

1. A process of operating a data processor to enable the data processor to select, from a plurality of artifacts having known specifications, those artifacts that may be combined to create a desired system having given specifications, the process comprising the steps of:
   storing specifications, in the form of labeled interval statements, for:
   (i) sets of artifacts, and
   (ii) the desired system to be formed from the plurality of artifacts,
   said specifications being under at least one set of operating conditions;
   hierarchically organizing the specifications;
   eliminating artifact sets whose specifications conflict with the desired system specifications;
   abstracting global artifact set specifications from the specifications of individual artifact sets, the global artifact set specifications being in the form of labeled interval statements;
   propagating specifications from the desired system specifications to artifact specifications, and from first artifact specifications, which may include individual and global artifact set specifications, to second artifact specifications, the propagated specifications being in the form of labeled interval statements;
   eliminating artifact sets whose specifications conflict with the artifact specifications propagated from the desired system specifications; and
   selecting the artifact sets that have not been eliminated.

2. A process according to claim 1, wherein the labeling on the labeled interval statements includes using limit statements indicating that a descriptive parameter of an artifact set, operating condition or desired system specification must be limited only to the values of the stated interval.

3. A process according to claim 2, wherein the labeling on the labeled interval statements further includes using a required statement, indicating that the descriptive interval label is required to be true for proper operation of the desired system.

4. A process according to claim 2, wherein the labeling on the labeled interval statements further includes using a no-stronger statement, indicating that the descriptive interval label cannot be specified by a smaller subset interval.

5. A process according to claim 2, wherein the labeling on the labeled interval statements includes using an assured statement, indicating that the descriptive interval label is assured be true for all the artifacts represented.

6. A process according to claim 1, wherein the labeling on the labeled interval statements includes using operating region statements indicating that a descriptive parameter of an artifact set, operating condition or desired system specification must take on at least every value of the stated interval, but can also take on values outside the stated interval.

7. A process according to claim 6, wherein the labeling on the labeled interval statements further includes using a required statement, indicating that the descriptive interval label is required to be true for proper operation of the desired system.

8. A process according to claim 6, wherein the labeling on the labeled interval statements further includes using a no-stronger statement, indicating that the descriptive interval label cannot be specified by a smaller subset interval.

9. A process according to claim 6, wherein the labeling on the labeled interval statements includes using an assured statement, indicating that the descriptive interval label is assured be true for all the artifacts represented.

10. A process according to claim 1, wherein the labeling on the labeled interval statements includes using:
   limit statements indicating that a descriptive parameter of an artifact set, operating condition or desired system specification must be limited only to the values of the stated interval;
   operating region statements indicating that a descriptive parameter of an artifact set, operating condition or desired system specification must take on at least every value of the stated interval, but can also take on values outside the stated interval;
   a required statement, indicating that the descriptive interval label is required to be true for proper operation of the desired system;

a no-stronger statement, indicating that the descriptive interval label cannot be specified by a smaller subset interval; and an assured statement, indicating that the descriptive interval label is assured be true for all the artifacts represented.

11. A process according to claim 10, wherein the creating of each labeled interval statement includes using: a variable; an interval of real numbers the variable is allowed to assume; and a designator indicating whether the variable is a continuous or state-variable.

12. A process according to claim 1, wherein the eliminating of artifact sets conflicting with the desired system specifications or by other artifact specifications includes:

performing the not-subset operation; and
performing the not-intersection operation.

13. A process according to claim 1, wherein the abstracting of global artifact set specifications from individual artifact set specifications includes:

performing the intersection operation; and
means for performing the filled-union operation.

14. A process according to claim 1, wherein the propagating specifications from the desired system specifications to artifact specifications and from first artifact specifications to second artifact specifications includes:

performing a range operation;
performing a domain operation;
performing a sufficient-points operation;
performing a filled-union operation; and
performing a intersection operation.

15. A device for selecting, from a plurality of artifacts having known specifications, those artifacts that may be combined to create a desired system having given specifications, the device comprising:

first means for storing specifications for the desired system and for sets of artifacts, in the form of labeled interval statements and under at least one set of operating conditions;

second means for receiving and then recording in the first means specifications for the desired system;

third means abstracting global artifact set specifications from the specifications of individual artifact sets, and then recording in the first means the global artifact set specifications;

fourth means for propagating specifications from the desired system specifications to artifact specifications, propagating specifications from first artifact specifications to second artifact specifications, and then recording the propagated artifact specifications in the first means;

fifth means for eliminating artifact sets whose specifications conflict with the desired system specifications, and for eliminating artifact sets whose specifications conflict with the artifact specifications propagated from the desired system specifications; and sixth means for listing the artifact sets that have not been eliminated by the fifth means.

16. A device according to claim 15, wherein in the first means the specifications are hierarchically organized.

17. A device according to claim 16, wherein in the first means the labeling on the labeled interval statements includes;

limit statements indicating that a descriptive parameter of an artifact set or desired system specification must be limited only to the values of the stated interval; and operating region statements indicating that a descriptive parameter of an artifact set or desired system specification must take on at least every value of the stated interval, but can also take on values outside the stated interval.

18. A device according to claim 17, wherein the labeling on the labeled interval statements includes:

a required statement, indicating that the descriptive interval label is required to be true for proper operation of the desired system;

a no-stronger statement, indicating that the descriptive interval label cannot be specified by a smaller subset interval; and an assured statement, indicating that the descriptive interval label is assured be true for all the artifacts represented.

19. A device according to claim 18, wherein each labeled interval statement includes:

a variable;
an interval of real numbers the variable is allowed to assume; and
a designator indicating whether the variable is a continuous or state-variable.

* * * * *